United States Patent
Yamamoto

(10) Patent No.: US 10,394,066 B1
(45) Date of Patent: Aug. 27, 2019

(54) METHOD OF PRODUCING DISPLAY PANEL

(71) Applicant: SHARP KABUSHIKI KAISHA, Sakai, Osaka (JP)

(72) Inventor: Kunihiko Yamamoto, Sakai (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 0 days.

(21) Appl. No.: 16/419,437

(22) Filed: May 22, 2019

Related U.S. Application Data

(60) Provisional application No. 62/683,636, filed on Jun. 12, 2018.

(51) Int. Cl.
   *G02F 1/1333* (2006.01)

(52) U.S. Cl.
   CPC .......... *G02F 1/133351* (2013.01); *G02F 2001/133354* (2013.01)

(58) Field of Classification Search
   CPC ........... G02F 1/133351; G02F 2001/133354
   See application file for complete search history.

(56) References Cited

U.S. PATENT DOCUMENTS

| | | | | |
|---|---|---|---|---|
| 5,846,110 A * | 12/1998 | Kanagu | ............... | H01J 9/241 445/25 |
| 6,876,150 B2 * | 4/2005 | Tanaka | ............... | C03C 8/24 313/582 |
| 8,257,541 B2 * | 9/2012 | Hasegawa | ............... | C03B 23/0252 156/285 |
| 2004/0242117 A1 * | 12/2004 | Park | ............... | H01L 27/3251 445/25 |
| 2005/0153477 A1 * | 7/2005 | Ammlung | ............... | H01L 21/31133 438/106 |
| 2006/0169989 A1 * | 8/2006 | Bhattacharya | ............... | H01L 51/0021 257/79 |
| 2007/0121051 A1 * | 5/2007 | Yokoyama | ............... | G02F 1/13394 349/156 |
| 2010/0099323 A1 * | 4/2010 | Zu | ............... | H01L 51/5246 445/25 |
| 2011/0037382 A1 * | 2/2011 | Choi | ............... | H01L 51/524 313/504 |
| 2016/0195742 A1 * | 7/2016 | Kim | ............... | G02F 1/133788 349/33 |

FOREIGN PATENT DOCUMENTS

JP    2002-014359 A    1/2002

* cited by examiner

*Primary Examiner* — Donald L Raleigh
(74) *Attorney, Agent, or Firm* — ScienBiziP, P.C.

(57) ABSTRACT

A method of producing a display panel including substrates having an inner space therebetween surrounded by a sealing material and an outer space outside the inner space and one substrate includes an inner space structure part and an outer space structure part, the method includes a substrate deforming step of displacing a part of the outer space structure part toward another substrate to cause an end part of the inner space structure part near the part of the outer space structure part to be moved away from the other substrate, resulting in a part of the inner space structure part being warped to be away from the other substrate, a dividing step of dividing the substrates into portions configuring the inner space and the outer space, and a substrate bending step of bending the portion of the substrates configuring the inner space so that the one substrate projects outward.

3 Claims, 9 Drawing Sheets

FIG.5
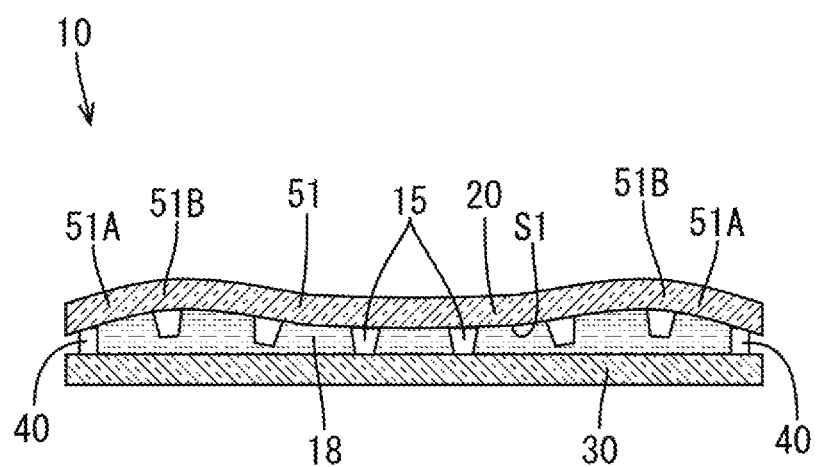
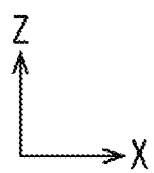

US 10,394,066 B1

METHOD OF PRODUCING DISPLAY PANEL

CROSS REFERENCE TO RELATED APPLICATION

This application claims priority from U.S. Provisional Application No. 62/683,636 filed on Jun. 12, 2018. The entire contents of the priority application are incorporated herein by reference.

TECHNICAL FIELD

The present technology described herein relates to a method of producing a display panel.

BACKGROUND ART

Conventionally, as a display panel having paired substrate laminated together, one forming a bent shape has been known. Described in Patent Literature 1 below is a method of laminating paired substrates configuring a display panel while bending each substrate.

RELATED ART DOCUMENT

[Patent Literature 1] Japanese Unexamined Patent Application Publication No. 2002-14359

In the manufacturing method described in Patent Literature 1, a stage having a curved surface patterned on the bent shape of the paired substrates is prepared, and a work of laminating the paired substrates together is performed on that curved surface. Thus, a dedicated stage forming a bent shape is required, and cost of manufacture is increased. Here, a method can be thought in which flat-plate-shaped paired substrates are laminated together and then bent. According to this method, a work of laminating the paired substrates together can be performed by using a stage for manufacturing a display panel forming a flat plate shape. However, in this manufacturing method, a concern is generated by a situation in which compression loading acts on a substrate of the paired substrates that is on a side near the center of curvature to cause the substrate to be warped and deformed.

SUMMARY

The present technology has been completed based on the above-described circumstances, and has an object of the present technology is restricting the substrates from being warped and deformed when the paired substrates are bent.

To solve the above-described problem, one embodiment of the present technology is directed to a method of producing a display panel in which a space between paired substrates disposed in an opposing manner has an inner space surrounded by a sealing material interposed between the paired substrates and an outer space disposed outside the inner space and one substrate of the paired substrates includes a portion configuring the inner space as an inner space structure part and a portion configuring the outer space as an outer space structure part, the method includes: a substrate deforming step of displacing at least a part of the outer space structure part toward another substrate of the paired substrates to cause an end part of the inner space structure part near the at least the part of the outer space structure part to be moved around the sealing material and moved away from the other substrate, resulting in at least a part of the inner space structure part being warped to be away from the other substrate; a dividing step to be performed after the substrate deforming step to divide the paired substrates into a portion of the paired substrates configuring the inner space and a portion of the paired substrates configuring the outer space; and a substrate bending step to be performed after the dividing step to bend the portion of the paired substrates configuring the inner space so that the one substrate projects outward.

After at least the part of the inner space structure part is warped to the side away from the other substrate in the substrate deforming step, the portion of the paired substrates configuring the inner space is bent so that the side of the one substrate extends outward in the substrate bending step. Thus, the warped inner space structure part extends, and the perimeter of the portion of the one substrate configuring the inner space is longer than the perimeter of the other substrate configuring the inner space. With this, compressive stress is less likely to act on the portion of the other substrate configuring the inner space in the substrate bending step, and warping of the portion of the other substrate configuring the inner space is less likely to be caused.

According to the present technology, when the paired substrates are bent, the substrates are less likely to be warped and deformed.

BRIEF DESCRIPTION OF THE DRAWINGS

FIG. 5 is a sectional view depicting the liquid-crystal panel before bending.

DETAILED DESCRIPTION

Figure 1:
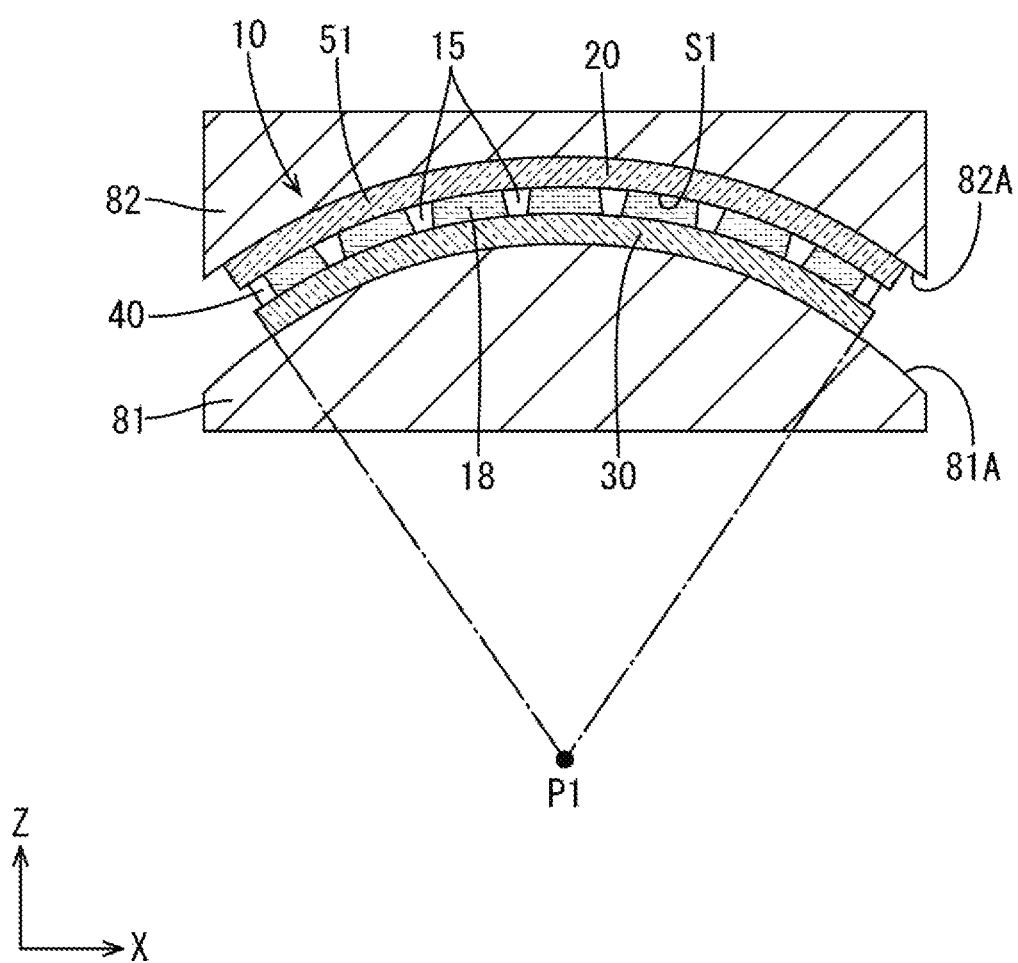
FIG. 1 is a sectional view of a liquid-crystal panel according to one embodiment of the present invention.

One embodiment of the present technology will be described based on FIG. 1 to FIG. 9. In the present embodiment, a liquid-crystal panel 10 (display panel) configuring a liquid-crystal display device is exemplarily described. The liquid-crystal panel 10 includes, as depicted in FIG. 1, paired substrates 20 and 30 with excellent light-transmitting characteristics and a liquid-crystal layer 18 containing liquid-crystal molecules. The liquid-crystal panel 10 forms in a bent shape as a whole. Of both of the substrates 20 and 30, a substrate on a front side is the CF substrate 20 (color filter substrate), and a substrate on a back surface side is the array substrate 30. The liquid-crystal layer 18 is disposed so as to be interposed between both of the substrates 20 and 30. The liquid-crystal molecules in the liquid-crystal layer 18 are substances with optical characteristics changing with the change of the orientation in accordance with the application of an electric field. On an inner surface side of each of the substrates 20 and 30, an alignment film is formed for orientating the liquid-crystal molecules in the liquid-crystal layer 18 to a predetermined direction. Also, outside each of the substrates 20 and 30, a polarizing plate is affixed. Also, in a display area of the liquid-crystal panel 10, a plurality of spacers 15 for defining a space between both of the substrates 20 and 30 are interposed in a matrix between the substrates 20 and 30.

The array substrate 30 has a square form in a planar view, and includes at least a TFT (Thin Film Transistor) as a switching element, a pixel electrode, an insulating film, and lines (such as source lines and gate lines). For an active layer of the TFT, for example, an oxide semiconductor is used.

The insulating film is formed of, for example, an inorganic material such as silicon nitride ($SiN_x$) or silicon oxide ($SiO_2$) or an organic material such as acrylic resin (for example, PMMA) or the like. The lines are formed of, for example, a metal material such as copper, titanium, aluminum, molybdenum, or tungsten. The CF substrate 20 forms a square shape in a planar view, and includes color filters of R (red), G (green), B (blue), and so forth, a black matrix, and an opposing electrode arranged so as to be opposed to the pixel electrode. The pixel electrode and the opposing electrode are formed of, for example, a transparent electrode material such as ITO (Indium Tin Oxide) or IZO (Indium Zinc Oxide).

The CF substrate 20 and the array substrate 30 are laminated together via a sealing material 40. The sealing material 40 forms a substantially square frame shape, and is disposed along the outer shape of the CF substrate 20 so as to surround the liquid-crystal layer 18. A portion surrounded by the sealing material 40 corresponds to a display area of the liquid-crystal panel 10. For the sealing material 40, a known sealing material formed of, for example, ultraviolet curing resin or thermosetting resin, is used, and contains beads. The liquid-crystal panel 10 is configured so that a reference potential is applied to the opposing electrode on the CF substrate 20 and, with the potential applied to the pixel electrode being controlled by the TFT, a predetermined potential difference occurs between the pixel electrode and the opposing electrode and the liquid-crystal molecules in the liquid-crystal layer 18 are oriented to a predetermined orientation. And, the liquid-crystal panel 10 can display images by using light applied from a backlight device as an external light source.

Figure 2:
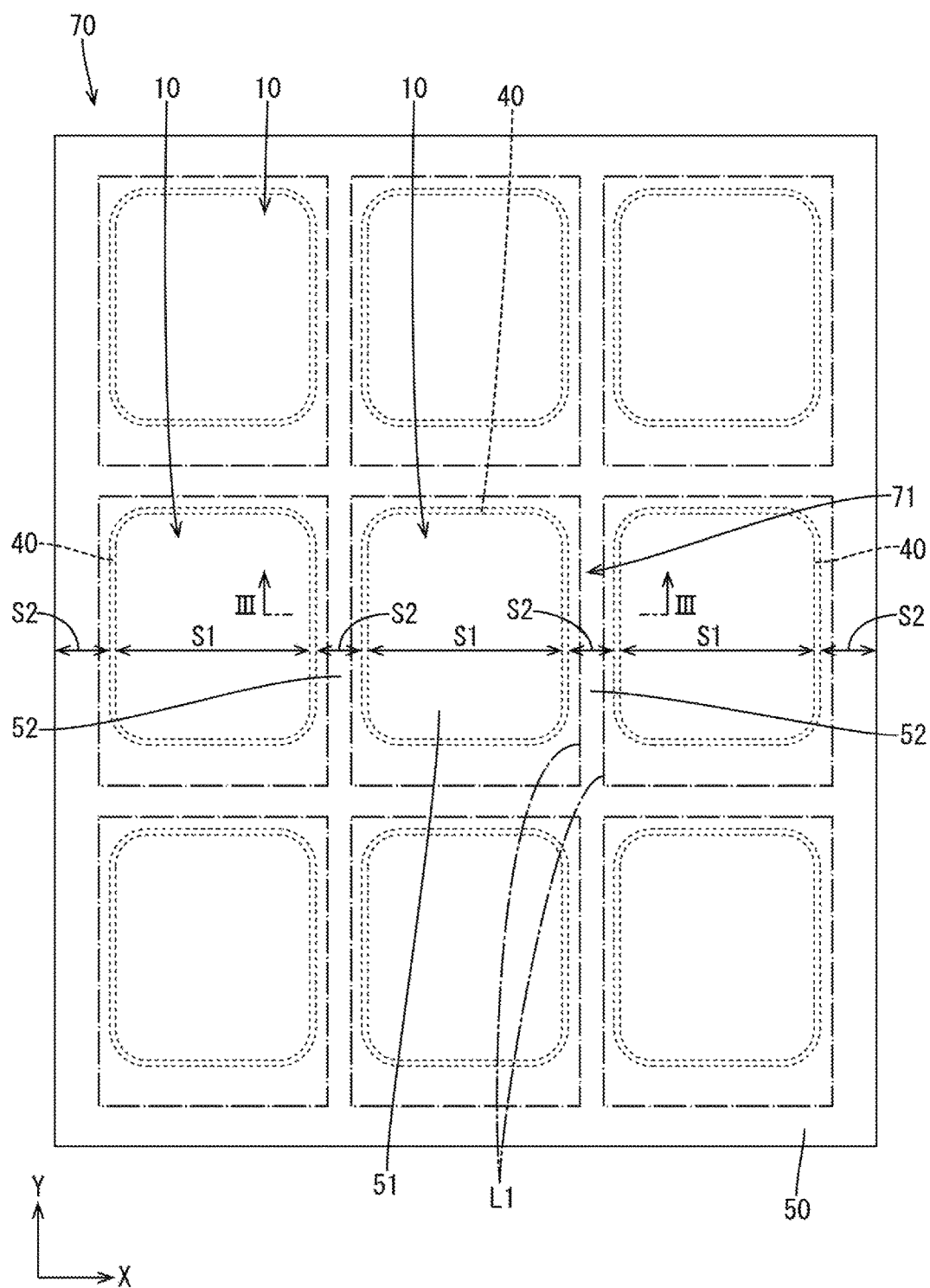
FIG. 2 is a plan view depicting a mother liquid-crystal panel (a state viewed from a mother CF substrate side).
Figure 3:
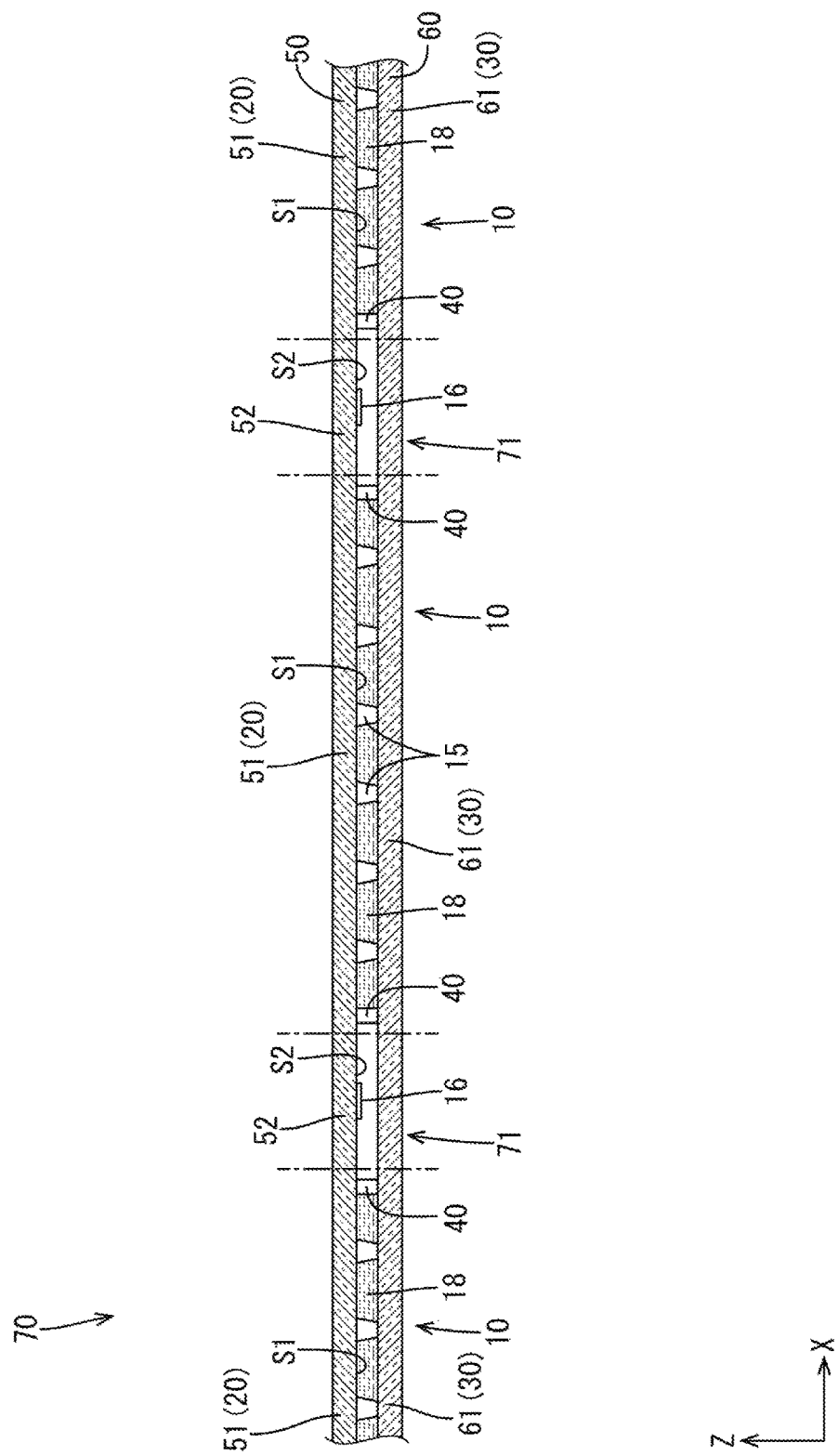
FIG. 3 is a sectional view depicting the mother liquid-crystal panel.

Next, a method of producing the liquid-crystal panel 10 is described. In the present embodiment, as depicted in FIG. 3, a mother CF substrate 50 having a plurality of CF substrates 20 integrated together and a mother array substrate 60 having a plurality of array substrates 30 integrated together are each manufactured. By dividing a mother liquid-crystal panel 70 having the mother CF substrate 50 and the mother array substrate 60 laminated together, a plurality of liquid-crystal panels 10 are produced. As depicted in FIG. 2, in the mother liquid-crystal panel 70, the plurality of liquid-crystal panels 10 are disposed in a matrix. The method of producing the liquid-crystal panel 10 includes a substrate manufacturing step of manufacturing each of the mother CF substrate 50 and the mother array substrate 60, a sealing material applying step, a liquid-crystal dropping step, a laminating step, a substrate deforming step, a seal curing step, a dividing step, and a substrate bending step.

In the substrate manufacturing step, the mother CF substrate 50 and the mother array substrate 60 are each manufactured by laminating and forming various metal films, insulating films, transparent electrode films, and so forth on a glass substrate by a known photolithography scheme or the like. Note that in the substrate manufacturing step, as depicted in FIG. 3, spacers 15 and spacers 16 are provided on a glass substrate configuring the mother CF substrate 50. The spacers 16 have a height (a length in a vertical direction of FIG. 2) lower than that of the spacers 15. In the sealing material applying step to be performed after the substrate manufacturing step, the sealing material 40 is applied onto the mother array substrate 60 by using an inkjet device, dispenser, or the like. In the liquid-crystal dropping step to be performed after the sealing material applying step, liquid crystals are dropped onto a portion surrounded by the sealing material 40 in the mother array substrate 60 by using an ODF (One Drop Fill) method using a liquid-crystal dropping device to form the liquid-crystal layer 18.

In the laminating step to be preformed after the liquid-crystal dropping step, under a vacuum (under a reduced pressure lower than atmospheric pressure), the mother CF substrate 50 and the mother array substrate 60 are laminated together by using a laminating device. With this, as depicted in FIG. 3, the mother liquid-crystal panel 70 is formed. The mother liquid-crystal panel 70 has, as depicted in FIG. 3, a portion configuring the liquid-crystal panel 10 and an outer portion 71 positioned outside the liquid-crystal panel 10. This outer portion 71 is a portion to be removed when the mother liquid-crystal panel 70 is divided into the plurality of liquid-crystal panels 10. And, a space between the paired substrates 50 and 60 disposed in an opposing manner has, as depicted in FIG. 2 and FIG. 3, an inner space S1 surrounded by the sealing material 40 and an outer space S2 disposed on each of both sides (outside the inner space S1) with respect to the inner space S1 in an X-axis direction. As depicted in FIG. 3, the liquid-crystal layer 18 and the spacers 15 are disposed in the inner space S1. On the other hand, in the outer space S2, the liquid-crystal layer 18 is not disposed, and the spacers 16 are disposed.

In the following description, as depicted in FIG. 3, a portion of the mother CF substrate 50 configuring the inner space S1 is taken as an inner space structure part 51, and a portion of the mother CF substrate 50 configuring the outer space S2 is taken as an outer space structure part 52. As depicted in FIG. 3, the outer space structure part 52 is disposed on each of both sides with respect to the inner space structure part 51 in the X-axis direction. Since the above-described laminating step is performed under a vacuum, the pressure in the outer space S2 is lower than atmospheric pressure immediately after the laminating step. That is, the laminating step is one example of a pressure reducing step to be performed before the substrate deforming step to cause the outer space S2 to have a pressure lower than atmospheric pressure. Note that at the time when the laminating step ends, the mother CF substrate 50 and the mother array substrate 60 each form a flat shape.

Figure 4:
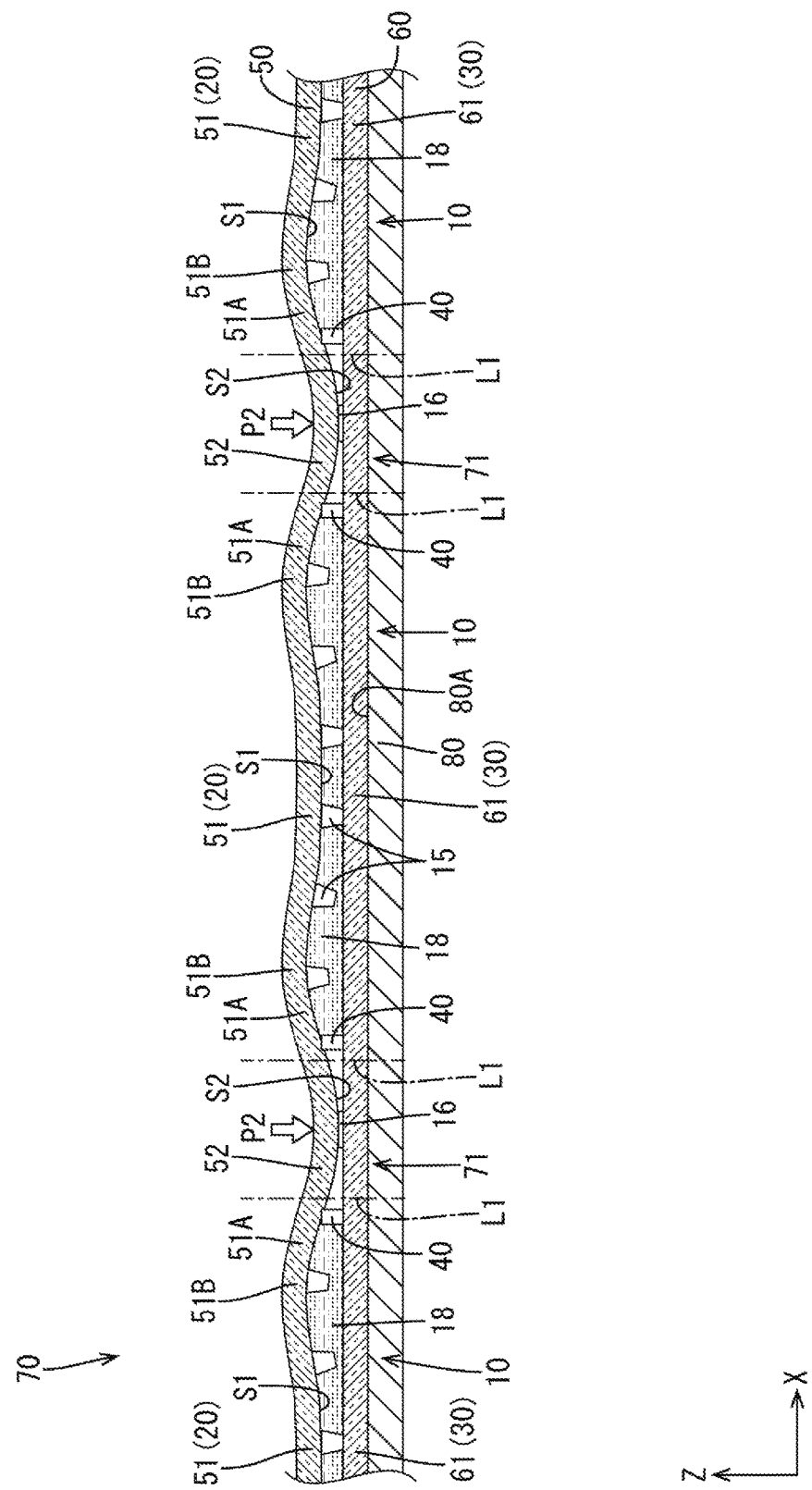
FIG. 4 is a sectional view depicting a substrate deforming step.

In the substrate deforming step to be performed after the laminating step, the mother liquid-crystal panel 70 is disposed under atmospheric pressure. As described above, in the previous step (laminating step), the outer space S2 has a pressure lower than atmospheric pressure. Also, the spacers 16 in the outer space S2 have a height lower than that of the spacers 15 in the inner space S1. Thus, by transferring the mother liquid-crystal panel 70 from under reduced pressure to under atmospheric pressure, as depicted in FIG. 4, the outer space structure part 52 is pressurized by atmospheric pressure P2 (a pressure difference between atmospheric pressure and the outer space S2) to a mother array substrate 60 side (downward in FIG. 4) to be warped and displaced. Then, an end part 51A of the inner space structure part 51 on an outer space structure part 52 side is rotated and displaced to a side away from the mother array substrate 60 (upward in FIG. 4) by taking the sealing material 40 as a fulcrum, resulting in a part 51B of the inner space structure part 51 being warped and deformed to the side away from the mother array substrate 60. Note in the substrate deforming step that a pressure-reduced state of the outer space S2 is preferably kept when the mother liquid-crystal panel 70 is disposed under atmospheric pressure. For example, the pressure-reduced state of the outer space S2 can be kept by interposing a sealing material between outer peripheral end parts of the mother CF substrate 50 and the mother array substrate 60.

Also in the substrate deforming step, in the step in which the part 51B of the inner space structure part 51 is warped, a part of the mother CF substrate 50 is slightly displaced from an outer space S2 side toward an inner space S1 side (a center side of the inner space structure part 51 in the X-axis direction). As a result, in the X-axis direction, the full length of the inner space structure part 51 after warping and deformation (a portion mainly configuring the CF substrate 20) is longer than the full length of a portion 61 of the mother array substrate 60 configuring the inner space S1 (a portion mainly configuring the array substrate 30).

Note in the substrate deforming step that the mother array substrate 60 side of the mother liquid-crystal panel 70 is mounted on an upper surface 80A (flat surface) of a stage 80. Thus, the mother array substrate 60 is not deformed by atmospheric pressure. Also, the substrate deforming step is performed before the seal curing step, which will be described further below. Thus, in the substrate deforming step, the sealing material 40 is not cured, and the mother CF substrate 50 and the mother array substrate 60 are not completely fixed together, and thus the mother CF substrate 50 can be easily warped and deformed by the atmospheric pressure P2.

Note in the substrate deforming step that since the outer space structure part 52 is displaced to the mother array substrate 60 side in a state in which the spacers 16 are arranged in the outer space S2, the outer space structure part 52 is displaced to the mother array substrate 60 side so that the spacers 16 makes contact with the mother array substrate 60. That is, by setting the height of the spacers 16, the amount of displacement of the outer space structure part 52 and, in turn, the amount of warping of the inner space structure part 51 can be set. Note as depicted in FIG. 4 that since the outer space structure part 52 is disposed on each of both sides of the inner space structure part 51 in the X-axis direction, the inner space structure part 51 is warped and displaced at both end parts in the X-axis direction.

In the seal curing step to be performed after the substrate deforming step, ultraviolet rays are applied to the sealing material 40 across the mother CF substrate 50 or the mother array substrate 60 and also (or after application) heat is applied. This cures the sealing material 40, thereby completely fixing the mother CF substrate 50 and the mother array substrate 60 together via the sealing material 40.

In the dividing step to be performed after the seal curing step, the mother liquid-crystal panel 70 is divided along a dividing line L1 depicted in FIG. 4 by using a scribing device or the like, and the mother liquid-crystal panel 70 is divided into the liquid-crystal panel 10, which is a portion configuring the inner space S1, and an outer portion 71, which is a portion configuring the outer space S2. With this, with the outer portion 71 removed, the mother liquid-crystal panel 70 is divided into the plurality of liquid-crystal panels 10 (portions configuring an inner space in the paired substrates). In this state, in the liquid-crystal panel 10 as depicted in FIG. 5, the array substrate 30 forms a flat shape, and the CF substrate 20 is in a warped state. That is, in a sectional view of FIG. 5, the full length of the CF substrate 20 is longer than the full length of the array substrate 30.

In the substrate bending step to be performed after the dividing step, as depicted in FIG. 1, the liquid-crystal panel 10 is interposed and pressurized between paired molds 81 and 82 having a convex curved surface 81A and a concave curved surface 82A, respectively, each with a desired radius of curvature, and the liquid-crystal panel 10 is thereby bent so that a CF substrate 20 side (one substrate) extends outward. With this, the CF substrate 20 and the array substrate 30 are each bent to form the liquid-crystal panel 10 in a bent state. Note that the CF substrate 20 in a warped state is extended in the course of being bent, thereby being released from that warping. Also, a center of curvature P1 of the bent liquid-crystal panel 10 is disposed with respect to the array substrate 30 oppositely to the CF substrate 20, as depicted in FIG. 1.

Next, the effects of the present embodiment are described. In the present embodiment, after the part 51B of the inner space structure part 51 is warped to the side away from the mother array substrate 60 in the substrate deforming step, the liquid-crystal panel 10 is bent so that the CF substrate 20 side extends outward in the substrate bending step. Thus, the warped CF substrate 20 (corresponding to the inner space structure part 51) extends, and the perimeter (the length of an arc in a circumferential direction, with the center of curvature P1 of FIG. 1 as a center) of the CF substrate 20 (a portion of one substrate configuring an inner space) is longer than the perimeter of the array substrate 30 (a portion of the other substrate configuring an inner space). With this, compressive stress is less likely to act on the array substrate 30 in the substrate bending step, and thus warping of the array substrate 30 is less likely to be caused.

Figure 6:
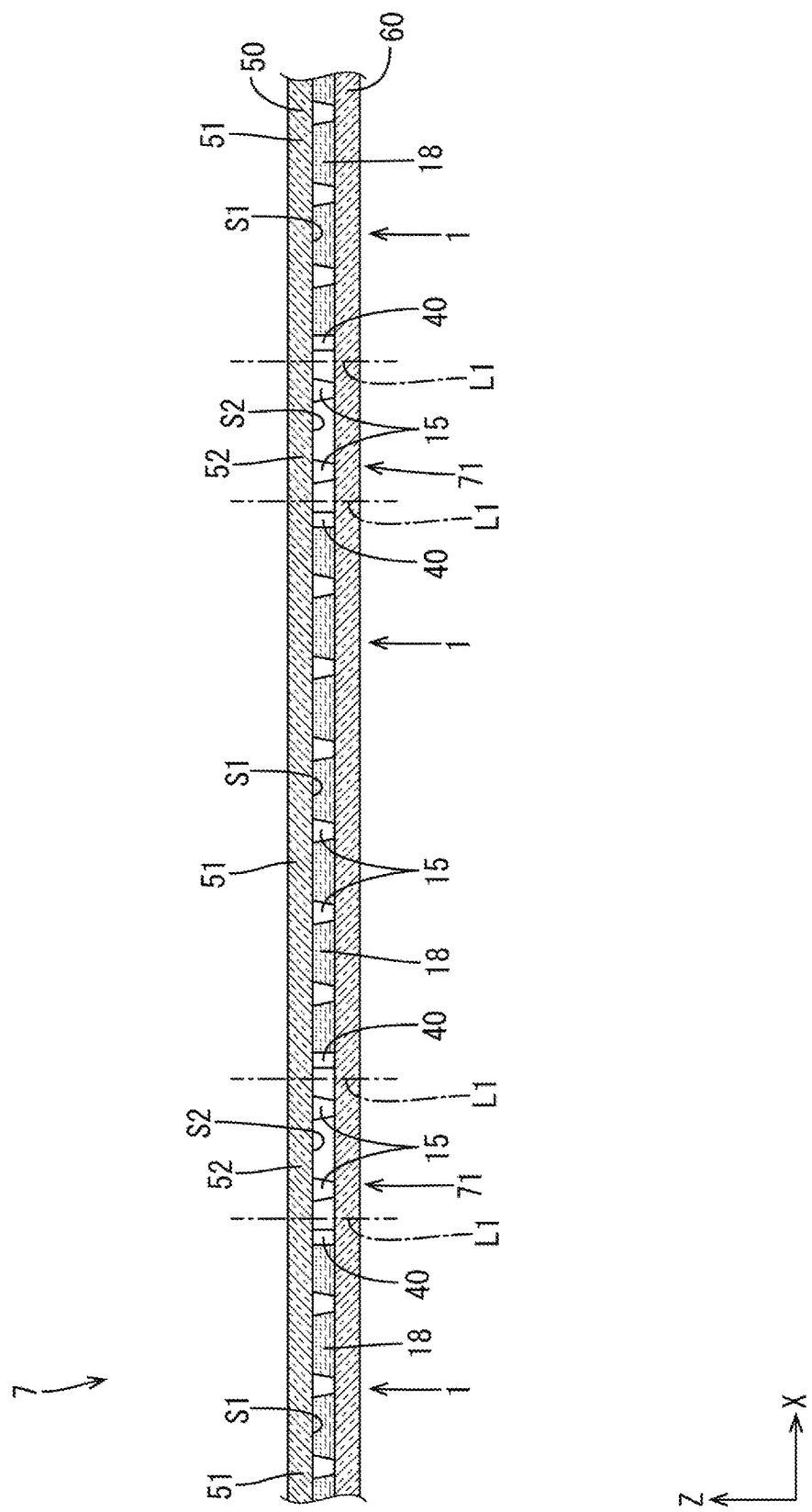
FIG. 6 is a sectional view depicting a mother liquid-crystal panel of a comparative example.
Figure 7:
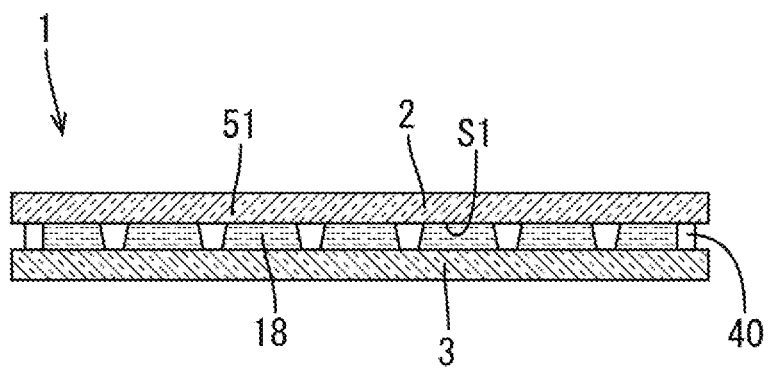
FIG. 7 is a sectional view depicting the mother liquid-crystal panel of the comparative example (a state before it is bent).
Figure 8:
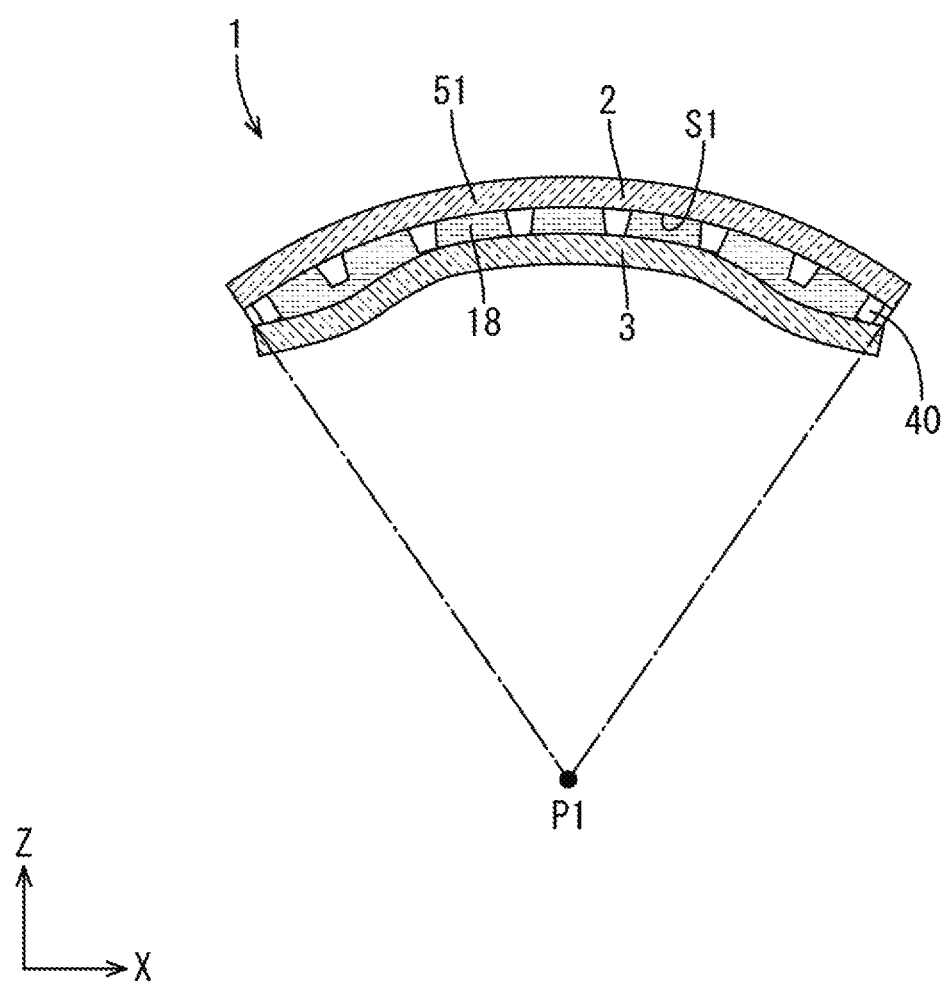
FIG. 8 is a sectional view depicting the mother liquid-crystal panel of the comparative example (a state after it is bent).

This is descried in detail by using a comparative example of FIG. 6 to FIG. 8. As depicted in FIG. 6, in a mother liquid-crystal panel 7 of the comparative example, spacers 15 having the same dimensions are disposed in an inner space S1 and an outer space S2. In this structure, when the mother liquid-crystal panel 7 is disposed under atmospheric pressure after the laminating step, the outer space structure part 52 is not warped, and the inner space structure part 51 is not warped and deformed, either. Thus, in a liquid-crystal panel 1 acquired by dividing the mother liquid-crystal panel 7, as depicted in FIG. 7, a CF substrate 2 and an array substrate 3 each have a flat shape and the same full length in the X-axis direction. When this liquid-crystal panel 1 is bent, as depicted in FIG. 8, due to a difference in the radius of curvature between the substrates 2 and 3, a concern is generated by a situation in which the array substrate 3 is subjected to compression loading to become warped and deformed. With this, in the liquid-crystal panel 1, the cell thickness becomes nonuniform to degrade display quality. In the present embodiment, the CF substrate 20 is partially warped to provide a margin, and then the liquid-crystal panel 10 is bent. Thus, the array substrate 30 is less likely to receive compression loading.

Also, in the present embodiment, provided is a pressure reducing step to be performed before the substrate deforming step to cause the outer space S2 under a reduced pressure lower than atmospheric pressure to have a pressure lower than atmospheric pressure. In the substrate deforming step, with the paired substrates 50 and 60 disposed under atmospheric pressure, a part of the outer space structure part 52 is displaced by atmospheric pressure to an array substrate 30 side. By atmospheric pressure, the CF substrate 20 can be pressurized, and can be uniformly pressurized compared with a method of pressurizing by using a tool. Note in the step of producing the liquid-crystal panel 10, the paired substrates 50 and 60 are laminated under reduced pressure (under a vacuum). Thus, in the substrate laminating step, the pressure inside the outer space S2 can be decreased to be lower than atmospheric pressure. That is, the pressure reducing step and the substrate laminating step can be simultaneously performed, and the number of steps is less likely to be increased.

Also, in the substrate deforming step of the present embodiment, in a state in which the spacers 16 lower than the spacers 15 disposed in the inner space S1 are arranged in the outer space S2, the outer space structure part 52 is displaced to the array substrate 30 side. By setting the height of the spacers 16 arranged in the outer space S2, the amount of displacement of the outer space structure part 52 can be set, and the amount of warping of the inner space structure part 51 can be set. Also in the present embodiment, in the process of producing the liquid-crystal panel 10, the mother liquid-crystal panel 70 is disposed from under a reduced pressure to under atmospheric pressure and, by using this, the CF substrate 20 can be warped by using atmospheric pressure. That is, only by arranging the spacers 16 in the outer space S2, the CF substrate 20 can be warped, and thus using a dedicated facility for warping the CF substrate 20 is not required, which is suitable.

Figure 9:
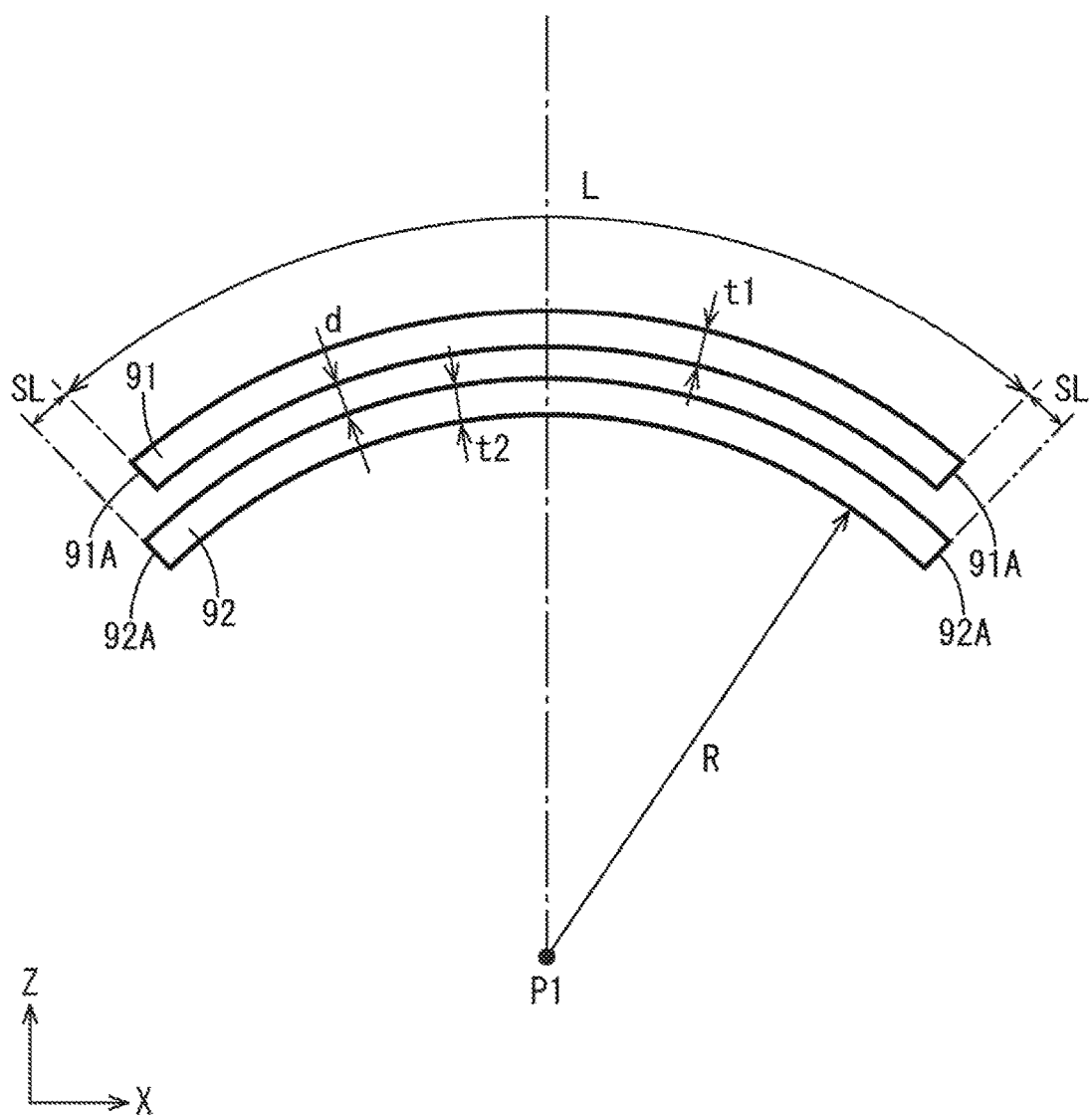
FIG. 9 is a diagram depicting a state in which paired substrates are bent when a sealing material is not interposed.

Meanwhile, as depicted in FIG. 9, paired substrates 91 and 92 having the same length L are bent without a sealing material interposed therebetween, an end face 91A of the substrate 91 and an end face 92A of the substrate 92 are positionally shifted at both ends of the paired substrates 91 and 92 in the circumferential direction. A positional shift amount SL between the end face 91A and the end face 92A can be found by following Equation (1). In Equation (1), R is a radius of curvature of a back surface of the substrate 91, d is a space (cell thickness) between the paired substrates 91 and 92, t1 is a thickness of the outer substrate 91, and t2 is a thickness of the inner substrate 92. If the paired substrates 91 and 92 are bent in a state of being fixed to each other at circumferential end parts via a sealing material, the substrate 92 is compressed by (2*SL) in the circumferential direction. thus, if the substrate 91 is set longer by (2*SL) than the substrate 92 in the state before bending, compression loading is less likely to act on the substrate 92 at the time of bending. Thus, in the present embodiment, it is only required that SL is calculated based on Equation (1) and the height of the spacers 16 is set based on that SL.

$$SL = L/2 * (t1 + t2 + d)/2/(R + t1/2) \quad (1)$$

For example, when L=135 mm, R=800 mm, d=3 μm, and t1=t2=0.15 mm, SL=approximately 13 from Equation (1). When the length of the outer space structure part 52 in the X-axis direction is 20 mm, it has been confirmed by the inventor of the present application that the CF substrate 20 can be made longer by 13 μm than the array substrate 30 by setting the height of the spacers 16 at 1.5 μm (a half of the height of the spacers 15). Note as depicted in FIG. 4 that since the outer space structure part 52 is disposed on each of both sides of the inner space structure part 51 in the X-axis direction, the inner space structure part 51 is warped and deformed at both end parts in the X-axis direction. Thus, when the height of the inner space structure part 51 is set at 1.5 μm, the CF substrate 20 can be made longer by 26 μm (=2*SL) in total than the array substrate 30.

OTHER EMBODIMENTS

The present technology is not limited to the embodiments described based on the above description and the drawings and, for example, the following embodiments are also included in the technological scope of the present technology.

(1) In the above-described embodiments, it has been exemplarily described that the mother liquid-crystal panel 70 is divided to produce a plurality of liquid-crystal panels 10, but this is not meant to be restrictive.

(2) In the above-described embodiments, the mother CF substrate 50 has been exemplarily described as one substrate and the mother array substrate 60 has been exemplarily described as the other substrate. However, this is not meant to be restrictive. For example, one substrate may be taken as the mother array substrate 60 and the other substrate may be taken as the mother CF substrate 50. That is, the liquid-crystal panel 10 may be bent so as to extend outward on the array substrate 30 side.

(3) In the above-described embodiments, the method has been exemplarily described in which the outer space structure part 52 is displaced to the mother array substrate 60 side by using atmospheric pressure in the substrate displacement step. However, this is not meant to be restrictive, and the outer space structure part 52 may be pressurized by a tool or the like to be displaced to the mother array substrate 60 side.

(4) In the above-described embodiments, the spacer 16 may not be disposed in the outer space S2.

(5) In the above-described embodiments, the liquid-crystal panel with the liquid-crystal layer interposed between the paired substrates has been exemplarily described as a display panel. However, the present invention can be applied also to a display panel with functional organic molecules (medium layer) other than liquid crystal interposed between the paired substrates.

The invention claimed is:

1. A method of producing a display panel in which a space between paired substrates disposed in an opposing manner has an inner space surrounded by a sealing material interposed between the paired substrates and an outer space disposed outside the inner space and one substrate of the paired substrates includes a portion configuring the inner space as an inner space structure part and a portion configuring the outer space as an outer space structure part, the method comprising:
    a substrate deforming step of displacing at least a part of the outer space structure part toward another substrate of the paired substrates to cause an end part of the inner space structure part near the at least the part of the outer space structure part to be moved around the sealing material and moved away from the other substrate, resulting in at least a part of the inner space structure part being warped to be away from the other substrate;
    a dividing step to be performed after the substrate deforming step to divide the paired substrates into a portion of the paired substrates configuring the inner space and a portion of the paired substrates configuring the outer space; and
    a substrate bending step to be performed after the dividing step to bend the portion of the paired substrates configuring the inner space so that the one substrate projects outward.

2. The method of producing a display panel according to claim 1, further comprising:
    a pressure reducing step to be performed before the substrate deforming step to reduce a pressure within the outer space to be lower than atmospheric pressure under a reduced pressure lower than atmospheric pressure, and in the substrate deforming step, by disposing the paired substrates under atmospheric pressure, at least a part of the outer space structure part is displaced by atmospheric pressure toward the other substrate.

3. The method of producing a display panel according to claim 1, wherein in the substrate deforming step, at least a part of the outer space structure part is displaced toward the other substrate while a spacer that is shorter than a spacer disposed in the inner space being disposed in the outer space.

* * * * *